US011117662B2

(12) United States Patent
Schwarzbach et al.

(10) Patent No.: US 11,117,662 B2
(45) Date of Patent: Sep. 14, 2021

(54) FLIGHT DIRECTION DISPLAY METHOD AND APPARATUS, AND UNMANNED AERIAL VEHICLE

(71) Applicant: AUTEL ROBOTICS CO., LTD., Guangdong (CN)

(72) Inventors: Marc Schwarzbach, Guangdong (CN); Jian Wang, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 412 days.

(21) Appl. No.: 16/158,899

(22) Filed: Oct. 12, 2018

(65) Prior Publication Data

US 2019/0047706 A1 Feb. 14, 2019

Related U.S. Application Data

(63) Continuation of application No. PCT/CN2017/080835, filed on Apr. 18, 2017.

(30) Foreign Application Priority Data

Apr. 18, 2016 (CN) .......................... 201610243427.3

(51) Int. Cl.
*G05D 1/00* (2006.01)
*B64C 39/02* (2006.01)
(Continued)

(52) U.S. Cl.
CPC ............ *B64C 39/024* (2013.01); *B64D 47/08* (2013.01); *G01C 23/005* (2013.01);
(Continued)

(58) Field of Classification Search
None
See application file for complete search history.

(56) References Cited

U.S. PATENT DOCUMENTS 9,817,396 B1* 11/2017 Takayama .......... G06K 9/00637
10,809,710 B2* 10/2020 Lee ...................... G05D 1/0038
(Continued)

FOREIGN PATENT DOCUMENTS

CN 202758245 U 6/2012
CN 102785780 A 11/2012
(Continued)

OTHER PUBLICATIONS https://wenku.baidu.com/view/e8b91049ad51f01dc381f175.html; Aug. 7, 2015; 79 Pages.
(Continued)

*Primary Examiner* — Jonathan M Dager (57) ABSTRACT

Embodiments of the present invention relate to a flight direction display method and apparatus, and an unmanned aerial vehicle. The method includes: obtaining a flight direction indication of an aircraft sent by a camera system, where the flight direction indication is determined by the camera system according to a relative angle between a camera apparatus and the aircraft; and displaying the flight direction indication of the aircraft on a shooting preview screen. In this way, a flight direction of the aircraft is controlled according to the flight direction indication, so that in a shooting process, a flight direction of a fuselage of the aircraft is the same as a rotation direction of the camera apparatus, so as to shoot content wanted by the camera apparatus, thereby improving user experience.

15 Claims, 5 Drawing Sheets

(51) Int. Cl.
  *B64D 47/08* (2006.01)
  *G01C 23/00* (2006.01)
  *H04N 7/18* (2006.01)
  *H04N 5/232* (2006.01)
  *H04N 5/272* (2006.01)

(52) U.S. Cl.
  CPC .......... *G05D 1/0038* (2013.01); *H04N 7/185* (2013.01); *B64C 2201/146* (2013.01); *H04N 5/23299* (2018.08); *H04N 5/272* (2013.01)

(56) References Cited

U.S. PATENT DOCUMENTS

| | | | |
|---|---|---|---|
| 10,877,477 B1* | 12/2020 | Fox | G07C 1/10 |
| 2003/0216834 A1 | 11/2003 | Allard | |
| 2009/0207048 A1* | 8/2009 | He | G01C 23/00 340/973 |
| 2010/0250022 A1* | 9/2010 | Hines | G05D 1/0094 701/2 |
| 2010/0292873 A1* | 11/2010 | Duggan | B64C 39/024 701/11 |
| 2012/0280087 A1* | 11/2012 | Coffman | G05D 1/0016 244/175 |
| 2012/0307042 A1 | 12/2012 | Lee et al. | |
| 2014/0067162 A1* | 3/2014 | Paulsen | B64C 19/00 701/2 |
| 2014/0267723 A1* | 9/2014 | Davidson, Jr. | G06T 19/006 348/147 |
| 2014/0336848 A1* | 11/2014 | Saund | G06T 7/215 701/3 |
| 2014/0379178 A1* | 12/2014 | Goossen | G05D 1/102 701/15 |
| 2016/0025462 A1* | 1/2016 | Downing | F41G 11/003 89/1.11 |
| 2016/0091894 A1* | 3/2016 | Zhang | G09B 9/24 701/2 |
| 2016/0117853 A1* | 4/2016 | Zhong | G01C 21/00 345/634 |
| 2016/0266579 A1* | 9/2016 | Chen | G07C 5/008 |
| 2016/0306351 A1* | 10/2016 | Fisher | G05D 1/0016 |
| 2016/0313732 A1* | 10/2016 | Seydoux | G06T 19/006 |
| 2017/0010611 A1* | 1/2017 | Tao | G06F 3/147 |
| 2017/0036771 A1* | 2/2017 | Woodman | B64C 25/54 |
| 2017/0076159 A1* | 3/2017 | Pupalaikis | G06T 3/0006 |
| 2017/0083027 A1* | 3/2017 | Tao | G08G 5/0034 |
| 2017/0192418 A1* | 7/2017 | Bethke | B64D 47/00 |
| 2017/0205826 A1* | 7/2017 | Smith | B64C 39/024 |
| 2018/0024546 A1* | 1/2018 | Ha | G05D 1/0016 701/2 |
| 2018/0046179 A1* | 2/2018 | Choi | B64C 39/024 |
| 2018/0143627 A1* | 5/2018 | Lee | G08G 5/0013 |
| 2018/0143636 A1* | 5/2018 | Pinto | G05D 1/0038 |
| 2018/0150073 A1* | 5/2018 | Lee | G05D 1/0038 |
| 2018/0188723 A1* | 7/2018 | Lee | H04N 5/23296 |
| 2018/0204343 A1* | 7/2018 | Galvane | G05D 1/0094 |
| 2018/0246529 A1* | 8/2018 | Hu | G05D 1/0038 |
| 2019/0011921 A1* | 1/2019 | Wang | G05D 1/0011 |
| 2019/0023395 A1* | 1/2019 | Lee | G06T 7/596 |
| 2019/0064794 A1* | 2/2019 | Chen | G05D 1/106 |
| 2019/0206269 A1* | 7/2019 | Chen | G06K 9/0063 |
| 2019/0220002 A1* | 7/2019 | Huang | G06T 7/70 |
| 2019/0236732 A1* | 8/2019 | Speasl | G06Q 50/163 |
| 2019/0295423 A1* | 9/2019 | Dow | G08G 5/0069 |
| 2019/0317502 A1* | 10/2019 | Guo | G05D 1/12 |
| 2019/0373184 A1* | 12/2019 | Kawaguchi | H04N 7/185 |
| 2019/0383608 A1* | 12/2019 | Nguyen | G01S 13/937 |
| 2020/0104598 A1* | 4/2020 | Qian | G05D 1/101 |
| 2020/0108931 A1* | 4/2020 | Zhou | B64D 1/18 |
| 2020/0141755 A1* | 5/2020 | Su | G05D 1/085 |
| 2020/0169666 A1* | 5/2020 | Gnoth | H04N 5/232933 |
| 2020/0183380 A1* | 6/2020 | Yui | G05D 1/0016 |
| 2020/0364848 A1* | 11/2020 | Fujita | B64C 39/024 |
| 2021/0011473 A1* | 1/2021 | Song | G01C 21/00 |
| 2021/0055746 A1* | 2/2021 | Jeong | G05D 1/0016 |
| 2021/0116942 A1* | 4/2021 | Gandiga | B60P 3/11 |

FOREIGN PATENT DOCUMENTS

| | | |
|---|---|---|
| CN | 102809969 A | 12/2012 |
| CN | 204452931 U | 7/2015 |
| CN | 105068544 A | 11/2015 |
| CN | 204887261 U | 12/2015 |
| CN | 204916207 U | 12/2015 |
| CN | 105391988 A | 3/2016 |
| CN | 105867361 A | 8/2016 |
| EP | 2557468 A2 | 2/2013 |
| JP | 2001309233 A | 11/2001 |
| JP | 2015106840 A | 6/2015 |

OTHER PUBLICATIONS

The International Search Report dated Jul. 19, 2017; PCT/CN2017/080835.
Supplementary European Search Report; Date Completed Feb. 14, 2019; Appln. No. EP17785414.
The First Chinese Office Action; dated May 2, 2018; Appln. No. 201610243427.2.

* cited by examiner

FLIGHT DIRECTION DISPLAY METHOD AND APPARATUS, AND UNMANNED AERIAL VEHICLE

CROSS REFERENCE

The present application is a continuation of International Application NO. PCT/CN2017/080835, filed on Apr. 18, 2017, which claims priority of Chinese Patent Application NO. 201610243427.3, filed on Apr. 18, 2016, both of which are incorporated herein by their entireties.

TECHNICAL FIELD

The present invention relates to the field of aircraft technologies, and in particular, to a flight direction display method and apparatus, and an unmanned aerial vehicle.

RELATED ART

With the increasing popularity of small aircrafts, image shooting by using aircrafts are increasingly common. To shoot images from multiple angles, generally, a camera system needs to be installed on an aircraft, and a camera apparatus of the camera system may rotate by multiple angles, for example, rotate by 360 degrees to shoot from various angles. In the prior art, in an unmanned aerial vehicle, a gimbal may be adopted to rotate and control a camera installed on the gimbal to shoot from different angles.

In a process of implementing the present invention, the inventor finds that the prior art has the following problems: A heading direction of the existing aircraft is generally controlled by a remote control, and a direction of the camera apparatus is controlled by a gimbal; in a professional aerial photography process, the heading direction of the aircraft is operated by one person (such as a pilot), and the gimbal is controlled by another person (photographer); and when the heading direction is different from an orientation of a lens of the camera apparatus, it is difficult for the two persons to communicate effectively so that the photographer can shoot wanted content.

SUMMARY

The objectives of the present invention are to provide a flight direction display method and apparatus, and an unmanned aerial vehicle, to resolve the technical problem in the prior art that wanted content cannot be shot when a heading direction of an unmanned aerial vehicle is different from an orientation of a lens of a camera apparatus.

To resolve the foregoing technical problem, embodiments of the present invention provide the following technical solutions:

According to a first aspect, an embodiment of the present invention provides a flight direction display method, applied to an aircraft installed with a camera system, including:

obtaining a flight direction indication of the aircraft sent by the camera system, where the flight direction indication is determined by the camera system according to a relative angle between a camera apparatus and the aircraft; and displaying the flight direction indication of the aircraft on a shooting preview screen.

Optionally, the obtaining a flight direction indication of the aircraft sent by the camera system specifically includes:

receiving, by a remote control system of the aircraft, the flight direction indication of the aircraft sent by the camera system.

Optionally, that the flight direction indication is determined by the camera system according to the relative angle between the camera apparatus and the aircraft specifically includes:

obtaining in real time, by the camera system obtains, a rotation angle of the camera apparatus relative to a heading direction of the aircraft; and determining, by the camera system, the flight direction indication according to the rotation angle of the camera apparatus relative to the heading direction of the aircraft.

Optionally, the method further includes:

superimposing the flight direction indication on an image shot in real time by the camera apparatus, to generate a real-time image having the flight direction indication; and sending, by the camera system, the real-time image having the flight direction indication.

Optionally, the displaying the flight direction indication of the aircraft on the shooting preview screen specifically includes:

displaying, on a screen of the remote control system, an image shot in real time by the camera system of the aircraft; and superimposing the flight direction indication of the aircraft on the image shot in real time by the camera system and displaying the image.

Optionally, the method further includes:

controlling a flight direction of the aircraft according to the flight direction indication.

According to a second aspect, an embodiment of the present invention further provides a flight direction display apparatus, applied to an aircraft installed with a camera system, including:

an obtaining unit, configured to obtain a flight direction indication of the aircraft sent by the camera system, where the flight direction indication is determined by the camera system according to a relative angle between a camera apparatus and the aircraft; and a display unit, configured to display the flight direction indication of the aircraft on a shooting preview screen.

Optionally, the obtaining unit is specifically configured to receive the flight direction indication of the aircraft sent by the camera system.

Optionally, the flight direction indication is determined by the camera system according to a rotation angle of the camera apparatus relative to a heading direction of the aircraft.

Optionally, the flight direction indication is superimposed on an image shot in real time by the camera apparatus, to generate a real-time image having the flight direction indication, and the obtaining unit is specifically configured to obtain the real-time image having the flight direction indication.

Optionally, the display unit is specifically configured to:

display, on a screen of a remote control system, an image shot in real time by the camera system of the aircraft; and superimpose the flight direction indication of the aircraft on the image shot in real time by the camera system and display the image.

Optionally, the apparatus further includes:

a control unit, configured to control a flight direction of the aircraft according to the flight direction indication.

According to a third aspect, an embodiment of the present invention further provides an unmanned aerial vehicle, including:

a gimbal, where the gimbal is installed with a camera apparatus, and the gimbal is configured to determine a flight direction indication of the unmanned aerial vehicle according to a relative angle between the camera apparatus and a fuselage of the unmanned aerial vehicle, and send the flight direction indication of the unmanned aerial vehicle; and a remote control system, where the remote control system is configured to obtain the flight direction indication sent by the gimbal, and display the flight direction indication of the aircraft on a shooting preview screen.

Optionally, the gimbal is specifically configured to:

obtain in real time a rotation angle of the camera apparatus relative to a heading direction of the unmanned aerial vehicle;

determine the flight direction indication according to the rotation angle of the camera apparatus relative to the heading direction of the unmanned aerial vehicle;

superimpose the flight direction indication on an image shot in real time by the camera apparatus, to generate a real-time image having the flight direction indication; and send the real-time image having the flight direction indication.

Optionally, the remote control system is specifically configured to:

receive the real-time image having the flight direction indication sent by the gimbal;

display, on a screen of the remote control system, an image shot in real time by the camera system of the aircraft; and superimpose the flight direction indication of the aircraft on the image shot in real time by the camera system and display the image.

According to a fourth aspect, an embodiment of the present invention further provides an aircraft, including:

at least one processor; and a memory in communication connection with the at least one processor, where the memory stores instructions that can be executed by the at least one processor, and the instructions are executed by the at least one processor, so that the at least one processor can perform the foregoing flight direction display method.

According to a fifth aspect, an embodiment of the present invention further provides a nonvolatile computer readable storage medium, where the computer readable storage medium stores computer executable instructions, and when the computer executable instructions are executed by the processor, the processor is caused to perform the foregoing flight direction display method.

According to a sixth aspect, an embodiment of the present invention further provides a computer program product, where the computer program product includes a computer program stored in a nonvolatile computer readable storage medium, the computer program includes program instructions, and when the program instructions are executed by the processor, the processor is caused to perform the foregoing flight direction display method.

In the embodiments of the present invention, a flight direction indication of an aircraft sent by a camera system is obtained, where the flight direction indication is determined by the camera system according to a relative angle between a camera apparatus and the aircraft, and a flight direction of the aircraft is controlled according to the flight direction indication, so that in a shooting process, a flight direction of a fuselage of the aircraft is the same as a rotation direction of the camera apparatus, so as to shoot content wanted by the camera apparatus, thereby improving user experience.

BRIEF DESCRIPTION OF THE DRAWINGS

One or more embodiments are described exemplarily by using the figures in the corresponding accompanying drawings. These exemplary descriptions do not constitute limitations to the embodiments. Elements with same reference numbers in the accompanying drawings represent similar elements. Unless otherwise specified, the figures in the accompanying drawings do not constitute proportional limitations.

DETAILED DESCRIPTION

To make the objectives, technical solutions, and advantages of the present invention clearer, the following further describes the present invention in detail with reference to the accompanying drawings and embodiments. It should be understood that, specific embodiments described herein are merely used for explaining the present invention, but are not used for limiting the present invention.

In addition, the technical features that are involved in the implementations of the present invention and that are described below may be combined with each other as long as the technical features do not conflict with each other.

Embodiment 1

Figure 1:
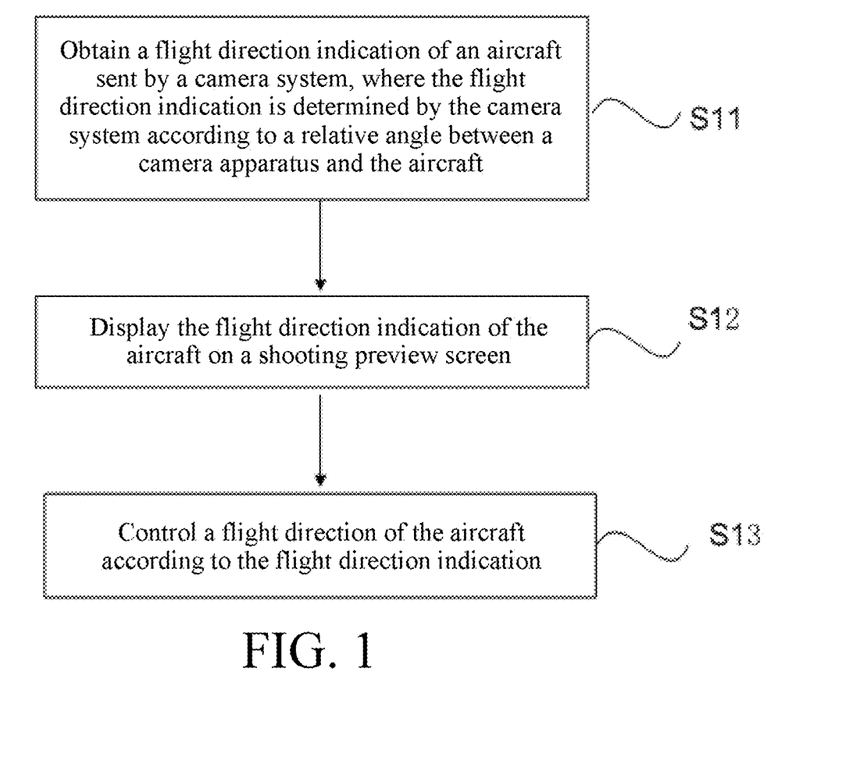
FIG. 1 is a schematic flowchart of a flight direction display method according to Embodiment 1 of the present invention.

Referring to FIG. 1, FIG. 1 is a schematic flowchart of a flight direction display method according to Embodiment 1 of the present invention. As shown in FIG. 1, the method of this embodiment of the present invention includes the following steps:

S11. Obtain a flight direction indication of an aircraft sent by a camera system, where the flight direction indication is determined by the camera system according to a relative angle between a camera apparatus and the aircraft.

In step S11, the flight direction indication of the aircraft is determined by the camera system according to the relative angle between the camera apparatus and the aircraft. After determining the flight direction indication, the camera system sends the flight direction indication to a remote control system of the aircraft. In this embodiment of the present invention, a flight direction of the aircraft mainly refers to a flight direction of a fuselage of the aircraft, and the flight direction depends on a heading direction of the aircraft. The relative angle between the camera apparatus and the aircraft mainly refers to a relative angle of a rotation direction of the camera apparatus relative to the heading direction of the aircraft in a shooting process.

In this embodiment of the present invention, the aircraft may be an unmanned aerial vehicle, the camera system of the aircraft is a gimbal that is of the unmanned aerial vehicle and that is installed with a camera apparatus, and the remote control system is a remote control operated by a user. Information, such as a remote control instruction or a shot image, is transmitted between the gimbal and the remote control in a wireless manner.

In this embodiment of the present invention, in a shooting process, to shoot content from different angles, the camera apparatus on the gimbal rotates by corresponding angles under control by the gimbal. In this case, because the fuselage of the unmanned aerial vehicle is flying under control of the remote control, a flight direction of the fuselage of the unmanned aerial vehicle may be different from the rotation angle of the camera apparatus. As a result, the camera apparatus cannot shoot wanted content. Therefore, to shoot content wanted by the camera apparatus, the gimbal needs to provide an indication of the heading direction of the unmanned aerial vehicle, and send the indication of the heading direction to the remote control.

In this embodiment of the present invention, the gimbal of the unmanned aerial vehicle may obtain in real time the rotation angle of the camera apparatus relative to the heading direction of the unmanned aerial vehicle in a shooting process. For example, when the unmanned aerial vehicle is currently on a horizontal plane, and the heading direction is a right front direction, to shoot an image having an anti-clockwise included angle of 30 degrees with the right front direction, the camera apparatus rotates by 30 degrees anti-clockwise relative to the heading direction of the unmanned aerial vehicle.

S12. Display the flight direction indication of the aircraft on a shooting preview screen.

In this embodiment of the present invention, the remote control system of the aircraft receives the flight direction indication of the unmanned aerial vehicle sent by the camera system. The camera system obtains in real time the rotation angle of the camera apparatus relative to the heading direction of the aircraft, and the camera system determines the flight direction indication according to the rotation angle of the camera apparatus relative to the heading direction of the aircraft. The flight direction indication of the unmanned aerial vehicle may be displayed in real time on the shooting preview screen of the remote control. In this case, an operator of the camera apparatus may clearly send an instruction to an operator of the unmanned aerial vehicle, to determine whether to keep flying in the current flight direction or adjust the flight direction. This increases shooting flexibility.

In this embodiment of the present invention, to indicate the flight direction of the unmanned aerial vehicle more visually, the flight direction indication of the unmanned aerial vehicle may be superimposed on an image shot in real time by the camera apparatus, to generate a real-time image having the flight direction indication, and then the real-time image having the flight direction indication is sent to the remote control.

Figure 2A:
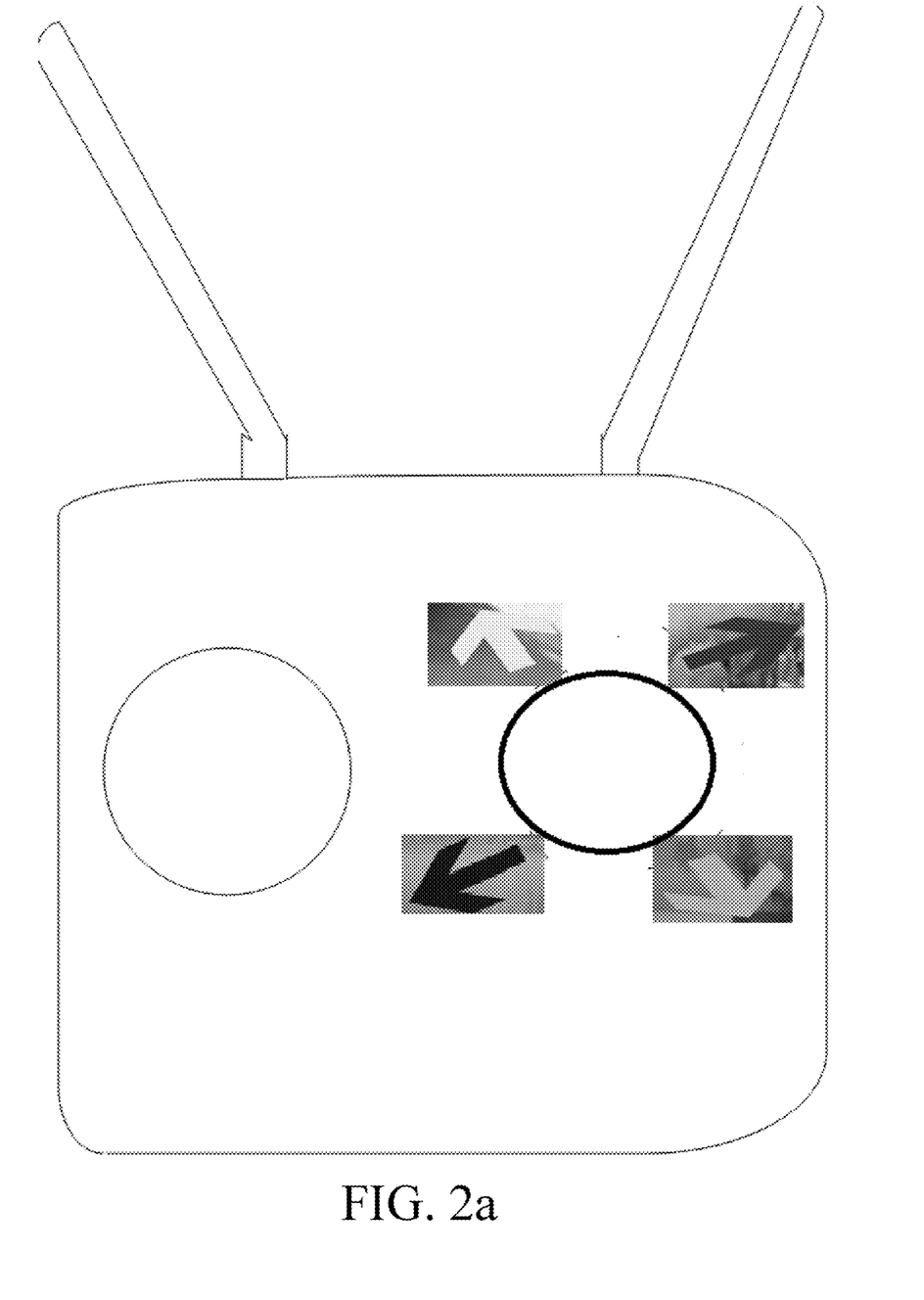
FIG. 2a, FIG. 2b, and FIG. 2c are separately schematic diagrams of a flight direction indication displayed by using a joystick of a remote control, a display screen of a remote control, and a display screen of a camera system.
Figure 2B:
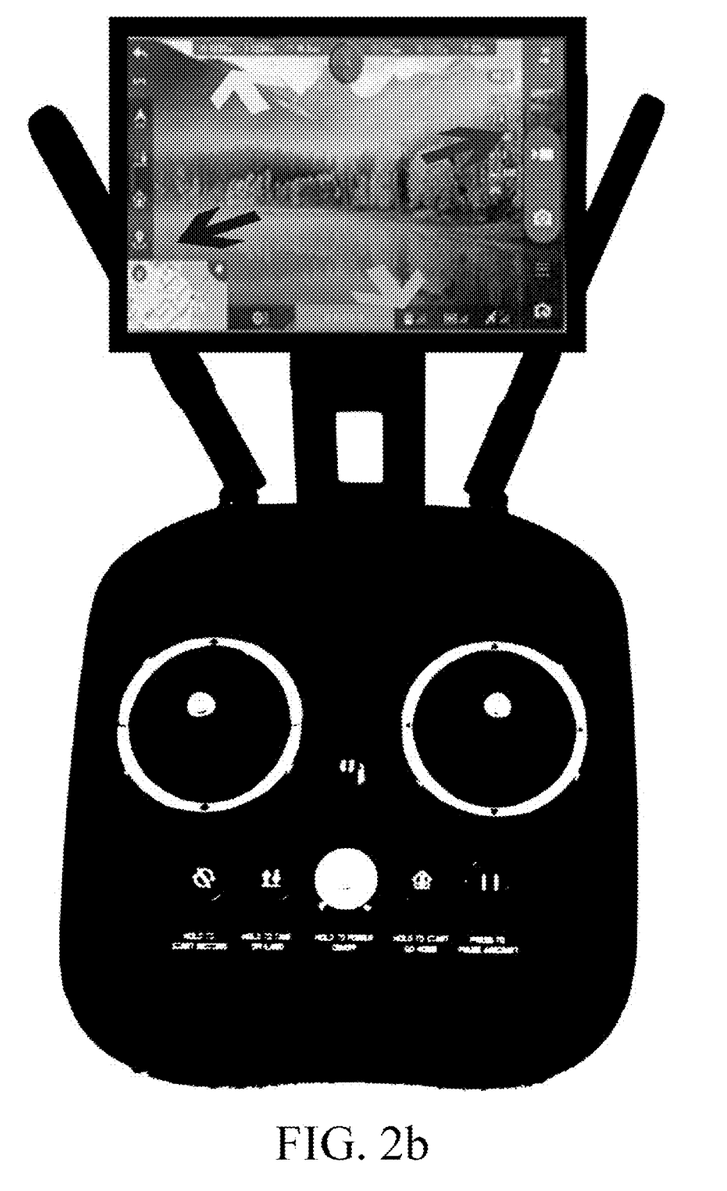
Figure 2C:
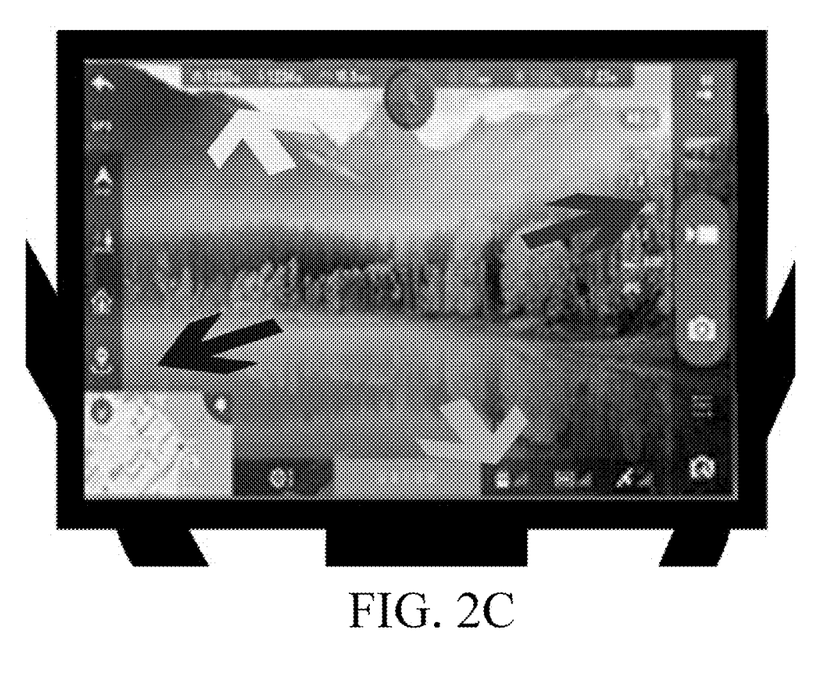

In this embodiment of the present invention, the flight direction indication may be indicated by direction arrows of different colors, or rotation angles. Moreover, to help an operator of the remote control understand the flight direction indication intuitively, the flight direction indication may be displayed on a display screen on the remote control, or may be indicated correspondingly by using a joystick of the remote control. FIG. 2a, FIG. 2b, and FIG. 2c are separately a flight direction indication displayed by using a joystick of a remote control, a display screen of a remote control, and a display screen of a camera system. FIG. 2b and FIG. 2c are real-time images having a flight direction indication shot by a shooting apparatus.

In this embodiment of the present invention, the flight direction indication of the unmanned aerial vehicle and the image shot in real time by the camera apparatus may be separately received. In this case, the displaying the flight direction indication of the aircraft on a shooting preview screen specifically includes:

displaying, on a screen of the remote control system, an image shot in real time by the camera system of the aircraft; and superimposing the flight direction indication of the aircraft on the image shot in real time by the camera system and displaying the image.

In another embodiment of the present invention, the method may further include: S13. Control a flight direction of the aircraft according to the flight direction indication.

In this embodiment of the present invention, after obtaining the flight direction indication, the remote control system of the aircraft may prompt an operator of the remote control system in an image manner. For example, when the aircraft is an unmanned aerial vehicle, and when the remote control receives the real-time image having the flight direction indication sent by the gimbal, the real-time image may be presented to the operator of the remote control by using the display screen, and the operator of the remote control may control the flight direction of the aircraft according to the real-time image having the flight direction indication.

In this embodiment of the present invention, the flight direction indication is not only prompted in an image manner, but also may be prompted in a text form, a voice form, or a video form. If the flight direction indication needs to be prompted in a text form, a voice form, or a video form, the camera system may generate the flight direction indication in a corresponding form when generating the flight direction indication. For example, the flight direction indication in a text form may be determined according to the relative angle between the camera apparatus and the aircraft, and may be output in a text form. For example, the flight direction indication is rotating by 30 degrees anticlockwise in a horizontal direction. If the flight direction indication is in a voice or video form, the operator of the camera system may record voice or videos to generate the corresponding flight direction indication, and send the flight direction indication to the remote control, and the remote control prompts the flight direction indication by using a voice or video output device.

In the method provided in this embodiment of the present invention, a flight direction indication of an aircraft sent by a camera system can be obtained, where the flight direction indication is determined by the camera system according to a relative angle between a camera apparatus and the aircraft, and the flight direction indication of the aircraft is displayed on a shooting preview screen. Moreover, a flight direction of the aircraft may be controlled according to the flight direction indication, so that in a shooting process, a flight direction of a fuselage of the aircraft is the same as a rotation direction of the camera apparatus, so as to shoot content wanted by the camera apparatus, thereby improving user experience.

Embodiment 2

Figure 3:
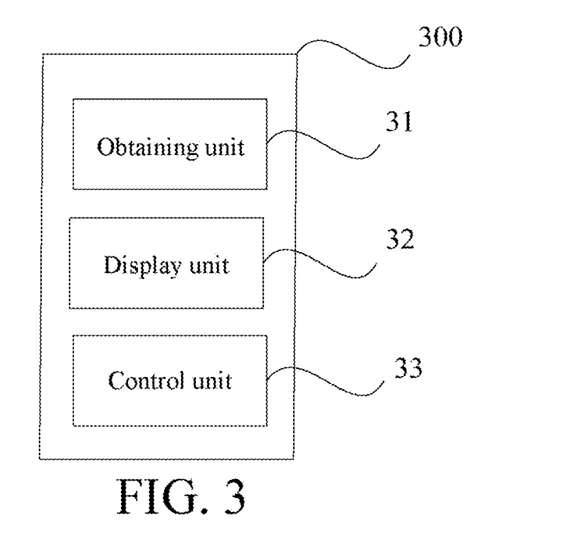
FIG. 3 is a schematic diagram of a flight direction display apparatus according to Embodiment 3 of the present invention.

As another aspect of the present invention, Embodiment 2 of the present invention provides a flight direction display apparatus. Referring to FIG. 3, FIG. 3 is a schematic diagram of a flight direction display apparatus according to Embodiment 2 of the present invention. As shown in FIG. 3, the apparatus 300 includes:

an obtaining unit 31, configured to obtain a flight direction indication of an aircraft sent by the camera system, where the flight direction indication is determined by the camera system according to a relative angle between a camera apparatus and the aircraft; and a display unit 32, configured to display the flight direction indication of the aircraft on a shooting preview screen.

In this embodiment of the present invention, the apparatus 300 further includes:

a control unit 33, configured to control a flight direction of the aircraft according to the flight direction indication.

In this embodiment of the present invention, the aircraft may be an unmanned aerial vehicle, the camera system is a gimbal that is of the unmanned aerial vehicle and that is installed with a camera apparatus. Therefore, the obtaining unit 31 is specifically configured to: receive the flight direction indication of the unmanned aerial vehicle sent by the gimbal, and prompt the flight direction indication in an image manner.

In this embodiment of the present invention, the flight direction indication may be determined by the camera system according to a rotation angle of the camera apparatus relative to the unmanned aerial vehicle. For example, when a heading direction of the unmanned aerial vehicle is currently a horizontal direction, to shoot an image having an anticlockwise included angle of 30 degrees with the horizontal direction, the camera apparatus rotates by 30 degrees anticlockwise relative to the heading direction of the unmanned aerial vehicle. To better shoot wanted content, the gimbal determines the flight direction indication according to the rotation angle of the camera apparatus relative to the unmanned aerial vehicle. For example, if the flight direction indication indicates that the flight direction of the unmanned aerial vehicle is the same as the rotation direction of the camera apparatus, it indicates that the flight direction of the unmanned aerial vehicle is an anticlockwise direction.

In this embodiment of the present invention, the flight direction indication may also be superimposed on an image shot in real time by the camera apparatus, to generate a real-time image having the flight direction indication. Therefore, the obtaining unit 31 is specifically configured to obtain the real-time image having the flight direction indication, and the control unit 33 is specifically configured to control the flight direction of the aircraft according to the real-time image having the flight direction indication.

In this embodiment of the present invention, the flight direction indication and the image shot by the camera apparatus are separately sent to a remote control system. In this case, the display unit 32 is specifically configured to:

display, on a screen of the remote control system, an image shot in real time by the camera system of the aircraft; and superimpose the flight direction indication of the aircraft on the image shot in real time by the camera system and display the image.

It should be noted that, the apparatus embodiment and the method embodiment of the present invention are based on the same inventive idea, and the technical solutions in the method embodiment are also applicable to the apparatus embodiment. Therefore, the same technical methods in the apparatus embodiment and the method embodiment are not described herein again.

In the apparatus provided in this embodiment of the present invention, the obtaining unit can obtain a flight direction indication of an aircraft sent by a camera system, where the flight direction indication is determined by the camera system according to relative angle between a camera apparatus and the aircraft, and the display unit can display the flight direction indication of the aircraft on a shooting preview screen. Moreover, the control unit controls a flight direction of the aircraft according to the flight direction indication, so that in a shooting process, a flight direction of a fuselage of the aircraft is the same as a rotation direction of the camera apparatus, so as to shoot content wanted by the camera apparatus, thereby improving user experience.

Embodiment 3

Figure 4:
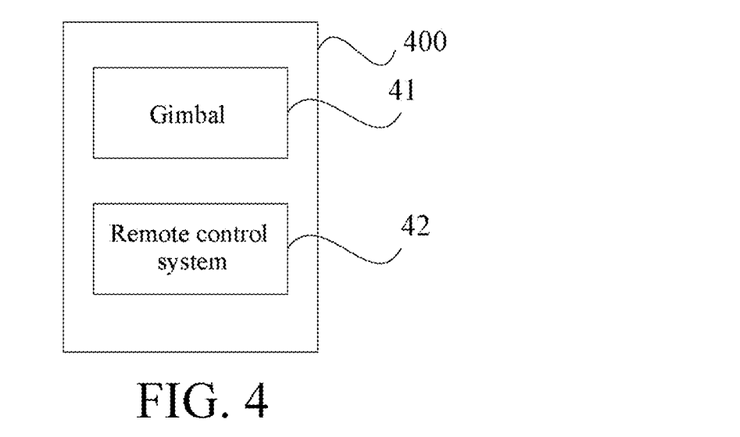
FIG. 4 is a schematic diagram of an unmanned aerial vehicle according to Embodiment 4 of the present invention.

As another aspect of the present invention, Embodiment 3 of the present invention provides an unmanned aerial vehicle. Referring to FIG. 4, FIG. 4 is a schematic diagram of an unmanned aerial vehicle according to Embodiment 4 of the present invention. As shown in FIG. 4, the unmanned aerial vehicle 400 includes:

a gimbal 41, where the gimbal is installed with a camera apparatus, and the gimbal is configured to determine a flight direction indication of the unmanned aerial vehicle according to a relative angle between the camera apparatus and a fuselage of the unmanned aerial vehicle, and send the flight direction indication of the unmanned aerial vehicle; and a remote control system 42, where the remote control system is configured to obtain the flight direction indication sent by the gimbal, and display the flight direction indication of the aircraft on a shooting preview screen.

In this embodiment of the present invention, the gimbal 41 may be specifically configured to:

obtain in real time a rotation angle of the camera apparatus relative to a heading direction of the unmanned aerial vehicle;

determine the flight direction indication according to the rotation angle of the camera apparatus relative to the heading direction of the unmanned aerial vehicle;

superimpose the flight direction indication on an image shot in real time by the camera apparatus, to generate a real-time image having the flight direction indication; and send the real-time image having the flight direction indication.

The remote control system 42 may be specifically configured to:

receive the real-time image having the flight direction indication sent by the gimbal;

display, on a screen of the remote control system, an image shot in real time by the camera system of the aircraft; and superimpose the flight direction indication of the aircraft on the image shot in real time by the camera system and display the image.

In this embodiment of the present invention, the remote control system 42 may be further configured to:

control a flight direction of the aircraft according to the real-time image having the flight direction indication.

In this embodiment of the present invention, a flight direction indication of an aircraft sent by a camera system can be obtained, where the flight direction indication is determined by the camera system according to a relative angle between a camera apparatus and the aircraft, and the flight direction indication of the aircraft is displayed on a shooting preview screen. Moreover, a flight direction of the aircraft may be controlled according to the flight direction indication, so that in a shooting process, a flight direction of a fuselage of the aircraft is the same as a rotation direction of the camera apparatus, so as to shoot content wanted by the camera apparatus, thereby improving user experience.

Figure 5:
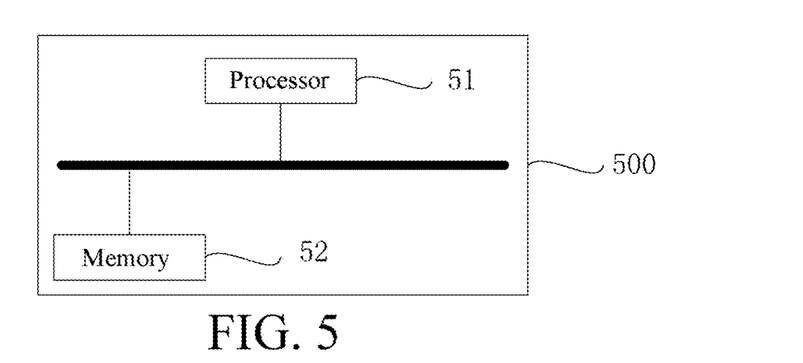
FIG. 5 is a schematic diagram of a hardware structure of an aircraft according to Embodiment 5 of the present invention.

FIG. 5 is a schematic diagram of a hardware structure of an aircraft according to an embodiment of the present invention. As shown in FIG. 5, the aircraft 500 includes:

one or more processors 51 and a memory 52, where one processor 51 is used as an example in FIG. 5.

The processor 51 and the memory 52 may be connected by using a bus or in other manners, where the bus is used as an example in FIG. 5.

As a nonvolatile computer readable storage medium, the memory 52 may be configured to store a nonvolatile software program, and a nonvolatile computer executable program and module, such as a program instruction/unit corresponding to the flight direction display method in the embodiments of the present invention (for example, the obtaining unit 31, the display unit 32, and the control unit 33 shown in FIG. 3). The processor 51 runs the nonvolatile software program, instruction and unit stored in the memory 52, to execute various functional applications and data processing of the aircraft, that is, implement the flight direction display method of the method embodiment.

The memory 52 may include a program storage area and a data storage area. The program storage area may store an operating system, and an application program needed by at least one function. The data storage area may store data created according to flight direction display and the like. In addition, the memory 52 may include a high-speed random access memory, and may also include a nonvolatile memory, for example, at least one magnetic disk storage device, a flash memory device, or another nonvolatile solid-state storage device. In some embodiments, the memory 52 optionally includes memories remotely disposed relative to the processor 51, and these remote memories may be connected to the aircraft through a network. Embodiments of the network include, but are not limited to, the Internet, an intranet, a local area network, a mobile communications network, or a combination thereof.

The one or more units are stored in the memory 52, and when the one or more units are executed by the one or more processors 51, the flight direction display method of any of the method embodiments is performed. For example, step S11 to step S13 in the foregoing described method in FIG. 1 are performed, to implement functions of the units 31 to 33 in FIG. 3.

The aircraft may perform the flight direction display method provided in the embodiments of the present invention, and has corresponding functional modules for performing the methods and beneficial effects. For technical details not described in detail in the aircraft embodiment, reference may be made to the flight direction display method provided in the embodiments of the present invention.

An embodiment of the present invention provides a nonvolatile computer readable storage medium, where the computer readable storage medium stores computer executable instructions, and the computer executable instructions are executed by one or more processors. For example, step S11 to step S13 are performed in the foregoing described method in FIG. 1, to implement the functions of the units 31 to 33 in FIG. 3.

The aircraft of the embodiments of the present application exists in multiple forms, including but not limited to:

(1) An unmanned aerial vehicle: the unmanned aerial vehicle includes a camera system and a remote control system.

(2) A remote control aircraft: the aircraft may shoot images by using a camera apparatus, and display a flight direction by using a remote control.

(3) Other aircrafts with a remote control and shooting function.

The foregoing described apparatus embodiments are merely exemplary. The units described as separate parts may or may not be physically separate, and the parts displayed as units may or may not be physical units, may be located in one position, or may be distributed on multiple network units. Some or all of the modules may be selected according to actual needs to achieve the objectives of the solutions of the embodiments.

Based on the foregoing descriptions of the embodiments, persons of ordinary skill in the art may clearly understand that the embodiments may be implemented by software plus a universal hardware platform, and certainly may be implemented by hardware. Persons of ordinary skill in the art may understand that all or some of the processes in the method embodiment may be implemented by a computer program instructing relevant hardware. The program may be stored in a computer readable storage medium, and when being executed, the program may include the processes of the method embodiment. The storage medium may be a magnetic disk, an optical disc, a read-only memory (ROM), a random access memory (RAM), or the like.

Finally, it should be noted that: the foregoing embodiments are merely used for explaining the technical solutions of the present invention, but are not used for limiting the present invention. Under the idea of the present invention, the technical features in the foregoing embodiments or different embodiments may also be combined, steps may be performed in any sequence, and many other changes of the foregoing different aspects of the present invention exist. For brevity, they are not provided in details. Although the present invention is described in detail with reference to the foregoing embodiments, persons of ordinary skill in the art should understand that they can still make modifications to the technical solutions recorded in the foregoing embodiments, or make equivalent replacements to some of the technical features, as long as these modifications or replacements do not cause the essence of the corresponding technical solutions to depart from the scope of the technical solutions of the embodiments of the present invention.

What is claimed is:

1. A flight direction display method, applied to an aircraft installed with a camera system, comprising:
obtaining a flight direction indication of the aircraft sent by the camera system, wherein the flight direction indication is determined by the camera system according to a relative angle between a camera apparatus and the aircraft; and
displaying the flight direction indication of the aircraft on a shooting preview screen.

2. The method according to claim 1, wherein the obtaining the flight direction indication of the aircraft sent by the camera system specifically comprises:
receiving, by a remote control system of the aircraft, the flight direction indication of the aircraft sent by the camera system.

3. The method according to claim 2, wherein that the flight direction indication is determined by the camera system according to the relative angle between the camera apparatus and the aircraft specifically comprises:
obtaining in real time, by the camera system, a rotation angle of the camera apparatus relative to a heading direction of the aircraft; and determining, by the camera system, the flight direction indication according to the rotation angle of the camera apparatus relative to the heading direction of the aircraft.

4. The method according to claim 1, wherein the method further comprises:
superimposing the flight direction indication on an image shot in real time by the camera apparatus, to generate a real-time image having the flight direction indication; and
sending, by the camera system, the real-time image having the flight direction indication.

5. The method according to claim 2, wherein the displaying the flight direction indication of the aircraft on the shooting preview screen specifically comprises:
displaying, on a screen of the remote control system, an image shot in real time by the camera system of the aircraft; and
superimposing the flight direction indication of the aircraft on the image shot in real time by the camera system and displaying the image.

6. The method according to claim 1, wherein the method further comprises:
controlling a flight direction of the aircraft according to the flight direction indication.

7. An unmanned aerial vehicle, comprising:
a gimbal, wherein the gimbal is installed with a camera apparatus, and the gimbal is configured to determine a flight direction indication of the unmanned aerial vehicle according to a relative angle between the camera apparatus and a fuselage of the unmanned aerial vehicle, and send the flight direction indication of the unmanned aerial vehicle; and
a remote control system, wherein the remote control system is configured to obtain the flight direction indication sent by the gimbal, and display the flight direction indication of the aircraft on a shooting preview screen.

8. The unmanned aerial vehicle according to claim 7, wherein the gimbal is specifically configured to:
obtain in real time a rotation angle of the camera apparatus relative to a heading direction of the unmanned aerial vehicle;
determine the flight direction indication according to the rotation angle of the camera apparatus relative to the heading direction of the unmanned aerial vehicle;
superimpose the flight direction indication on an image shot in real time by the camera apparatus, to generate a real-time image having the flight direction indication; and
send the real-time image having the flight direction indication.

9. The unmanned aerial vehicle according to claim 7, wherein the remote control system is specifically configured to:
receive the real-time image having the flight direction indication sent by the gimbal,
display, on a screen of the remote control system, an image shot in real time by the camera system of the aircraft; and
superimpose the flight direction indication of the aircraft on the image shot in real time by the camera system and display the image.

10. A flight direction display apparatus, in an aircraft installed with a camera system, comprising:
a memory storing computer executable instructions; and
a processor configured to execute the instructions to:
obtain a flight direction indication of the aircraft sent by the camera system, wherein the flight direction indication is determined by the camera system according, to a relative angle between a camera apparatus and the aircraft; and
display the flight direction indication of the aircraft on a shooting preview screen.

11. The apparatus according to claim 10, wherein the processor is further configured to:
receive the flight direction indication of the aircraft sent by the camera system.

12. The apparatus according to claim 11, wherein the flight direction indication is determined by the camera system according to a rotation angle of the camera apparatus relative to a heading direction of the aircraft.

13. The apparatus according to claim 12, wherein the flight direction indication is superimposed on an image shot in real time by the camera apparatus, to generate a real-time image having the flight direction indication, and
wherein the processor is further configured to:
obtain the real-time image having the flight direction indication.

14. The apparatus according to claim 13, wherein the processor is further configured to:
display, on a screen of a remote control system, an image shot in real time by the camera system of the aircraft; and
superimpose the flight direction indication of the aircraft on the image shot in real time by the camera system and display the image.

15. The apparatus according to claim 14, wherein the processor is further configured to:
control a flight direction of the aircraft according to the flight direction indication.

* * * * *